United States Patent [19]

Wouda et al.

[11] Patent Number: 4,709,378
[45] Date of Patent: Nov. 24, 1987

[54] ARRANGEMENT FOR GENERATING A CLOCK SIGNAL

[75] Inventors: Kornelis J. Wouda; Wilhelmus J. M. Reijntjens, both of Eindhoven, Netherlands

[73] Assignee: U.S. Philips Corporation, New York, N.Y.

[21] Appl. No.: 725,464

[22] Filed: Apr. 22, 1985

[30] Foreign Application Priority Data

Apr. 24, 1984 [NL] Netherlands ............... 8401310

[51] Int. Cl.<sup>4</sup> ............................................... H04L 7/02
[52] U.S. Cl. .................................... 375/110; 375/113; 328/72
[58] Field of Search ............... 375/94, 95, 110, 113; 328/63, 72, 74, 155; 370/100; 371/42, 46

[56] References Cited

U.S. PATENT DOCUMENTS

| | | | |
|---|---|---|---|
| 3,973,212 | 8/1976 | Walloch | 328/155 |
| 4,017,803 | 4/1977 | Baker | 375/95 |
| 4,146,743 | 3/1979 | Raynham | 375/110 |
| 4,167,760 | 9/1979 | Decker | 375/87 |
| 4,176,248 | 11/1979 | Sheets | 375/94 |
| 4,313,088 | 1/1982 | Van Gerwen et al. | 375/110 |
| 4,317,212 | 2/1982 | Van Gerwen et al. | 375/113 |
| 4,376,309 | 3/1983 | Fenderson et al. | 375/110 |
| 4,385,396 | 5/1983 | Norton | 375/110 |
| 4,412,339 | 10/1983 | Alfke et al. | 375/95 |
| 4,429,406 | 1/1984 | Hale | 375/113 |
| 4,457,005 | 6/1984 | Burke et al. | 375/120 |

Primary Examiner—Robert L. Griffin
Assistant Examiner—Stephen Chin
Attorney, Agent, or Firm—Anne E. Barschall; Marianne R. Rich

[57] ABSTRACT

A clock signal is derived from a biphase-modulated signal, by means of a controllable clock signal source. The polarity of the received signal is sampled at two sampling instants having a fixed relationship. The polarity samples are added modulo-2 and the resultant signal controls the controllable clock signal source. A false-synchronization detector includes inter alia a modulo-2 adder for comparing polarity samples in consecutive symbol intervals and a counter for counting consecutively equal polarity samples.

12 Claims, 4 Drawing Figures

ARRANGEMENT FOR GENERATING A CLOCK SIGNAL

BACKGROUND OF THE INVENTION

A(1) Field of the invention

The invention relates to an arrangement for generating a clock signal from a received biphase-modulated signal, comprising a controllable clock signal source.

Arrangements of such a type are suitable for application in arrangements for receiving digital signals which are, for example, used in the subscriber sets of digital telephone systems.

A(2) Description of the prior art

To recover the clock signal in a digital base-band transmission system, use is frequently made of non-linear processing of the received signal, optionally after this signal has been equalized, for generating spectral comonents at the bit repetition rate. A phase-locked loop (PLL) can be driven by the signal thus obtained.

When quantized feedback equalization is used or when a time-discrete echo cancellation system is applied, the signal to be used for the clock signal generation includes signal components produced by the local clock. In that case the clock generation method described above can still be used when the time-discrete portion of the receiving system operates with an adequately high sampling rate. In the case of biphase-encoded signals the processing rate is then four times the bit repetition rate.

SUMMARY OF THE INVENTION

The invention has for its object to provide an arrangement for generating a clock signal for a time-discrete receiving system with a lowest possible processing rate, the aim being to limit the processing rate to twice the bit rate.

According to the invention, the arrangement is therefore characterized in that the polarity of the received signal is sampled at two different instants in a symbol interval, that the polarity samples are compared with each other and if there is equality a control signal is generated in one sense (positive) and if there is no equality a control signal is generated in the other sense (negative) for the purpose of readjusting the frequency and the phase of a clock signal source from which the sampling instants and desired clock signal are derived.

SHORT DESCRIPTION OF THE DRAWINGS

FIG. 1 illustrates the characteristic eye pattern of biphase-encoded signal at the output of a Nyquist-I filter, FIG. 2 is the block diagram of a receiver for biphase-encoded signals, FIG. 3 illustrated the output signal of the phase detector of FIG. 2 for a slow change in the phase differnce between the clock and the received signal, FIG. 4 shows a detailed block circuit diagram of an embodiment of an arrangement according to the invention.

GENERAL DESCRIPTION OF THE INVENTION

In FIG. 1, tB and tF represent sampling instants within the symbol interval T at a mutal time spacing of T/4. In practice, it has been found that the mutual distance can be varied from approximately T/3 to approximately T/4. The instants tB and tF are derived from a local clock signal source and are to be synchronized with the received waveform such that tF coincides with the zero-crossing a of the characteristic eye pattern as is shown in FIG. 1. Before this synchronized state is reached, the instants tB and tF can shift relative to the received waveform.

As is illustrated in the block diagram of FIG. 2, a voltagecontrolled oscillator (VCO) 1 applies a signal to an adjustable divider 2 from which the sampling instants tB and tF are derived. With the aid of a decision circuit 3 it is deermined at the instants tB and tF whether the instantaneous signal level at a signal input 4 for the received biphase-encoded signal is greater or smaller than zero volt. The decision is stored as a digital signal B for the sampling instant tB and as a digital signal F for the sampling instant tF, the decisions "positive" and "negative" being stored as a "1" and a "0", respectively. In the synchronized state the digital signal B at an output 5 indicates in each symbol interval the value of the transmitted information.

From the combination of the signals B and F, a phase detector 6 derives information on the position of the sampling instants tB and tF with respect to the received biphase-encoded signal. When tF (FIG. 1) occurs just prior to the zero crossing a, then the signals B and F will be equal (both "1" or both "0"). When tF occurs just after the zero crossing a, then the signals B and F will be unequal. By adding modulo-2 the signals B and F in each symbol interval, a control voltage Vr can be obtained which, optionally after filtering if a low-pass filter 7 is provided, can be used to readjust the frequency and the phase of the VCO 1.

FIG. 3 shows the output signal of pahse detector 6 when the sampling instants tB and tF are slowly shifted with respect to the received signal. A symbol interval T (FIG. 1) is divided into twelve subintervals, numbered 1 to 12. The numbers in FIG. 3 indicate the position of the instant tF within the symbol interval. If tF falls within the subinterval 4, 5 or 6, then the signals B and F will be equal and it will hold that $B \oplus F = 0$ (where $\oplus$ indicates the modulo-2 addition). If tF falls within the subinterval 7, 8 or 9 then it holds that $B \oplus F \neq 0$. If tF falls in the subinterval 1, 2 or 3, then the value of $B \oplus F$ depends on the pattern of the received signal, namely on the sequence of the ones and zeroes in the received signal. When the signal has been scrambled prior to transmission, then the ones and zeroes occur with equal probability and the value of the control signal Vr is "½" after averaging over a large number of symbol intervals.

The frequency and the phase of the VCO must be stabilized by the control signal Vr such that tF becomes located at the border-line between the subintervals 6 and 7. The sampling instant tB then falls in that portion of the characteristic eye pattern (FIG. 1) which is suitable for determining the information transmitted in the symbol interval.

When tF is located at the border-line between the subintervals 12 and 1 (FIG. 3), then a situation occurs which is similar to the situation at the border-line between the subintervals 6 and 7, more specifically: in both cases the control signal Vr exhibits a transition from a low level to a higher level. It is then possible that the sampling instant tF of the VCO is stabilized by the control signal Vr at the border-line between the subintervals 12 and 1. Measures to prevent a stabilization on the transition at said last border-line will now be described on the basis of the following detailed embodiment.

DESCRIPTION OF THE PREFERRED EMBODIMENT (FIG. 4)

Figure 1:
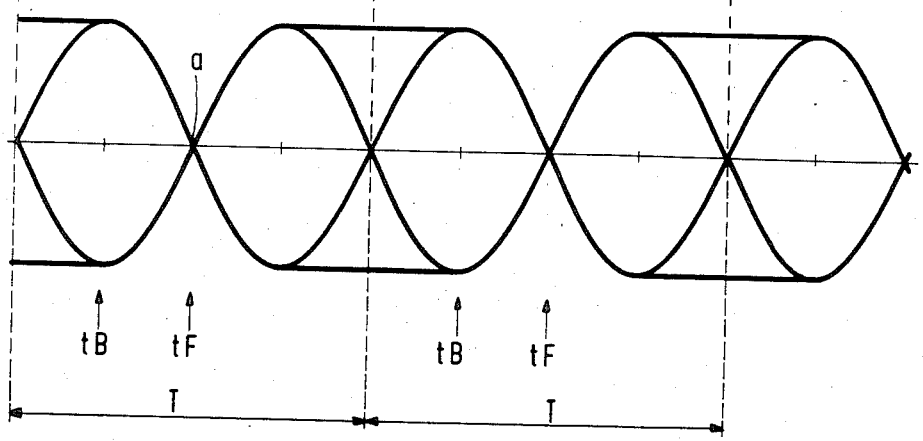
Figure 2:
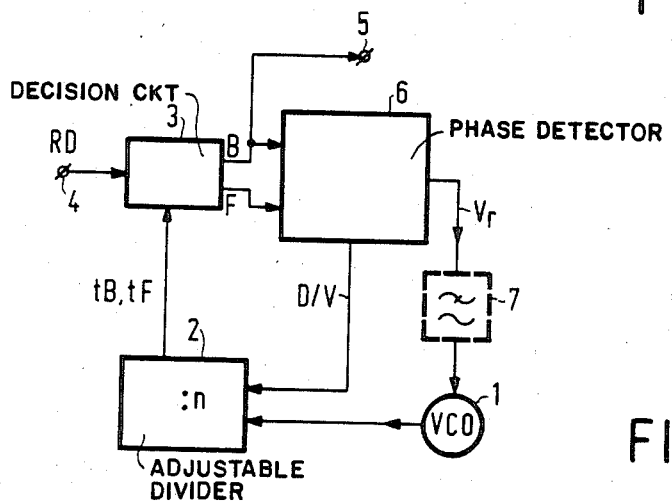
Figure 4:
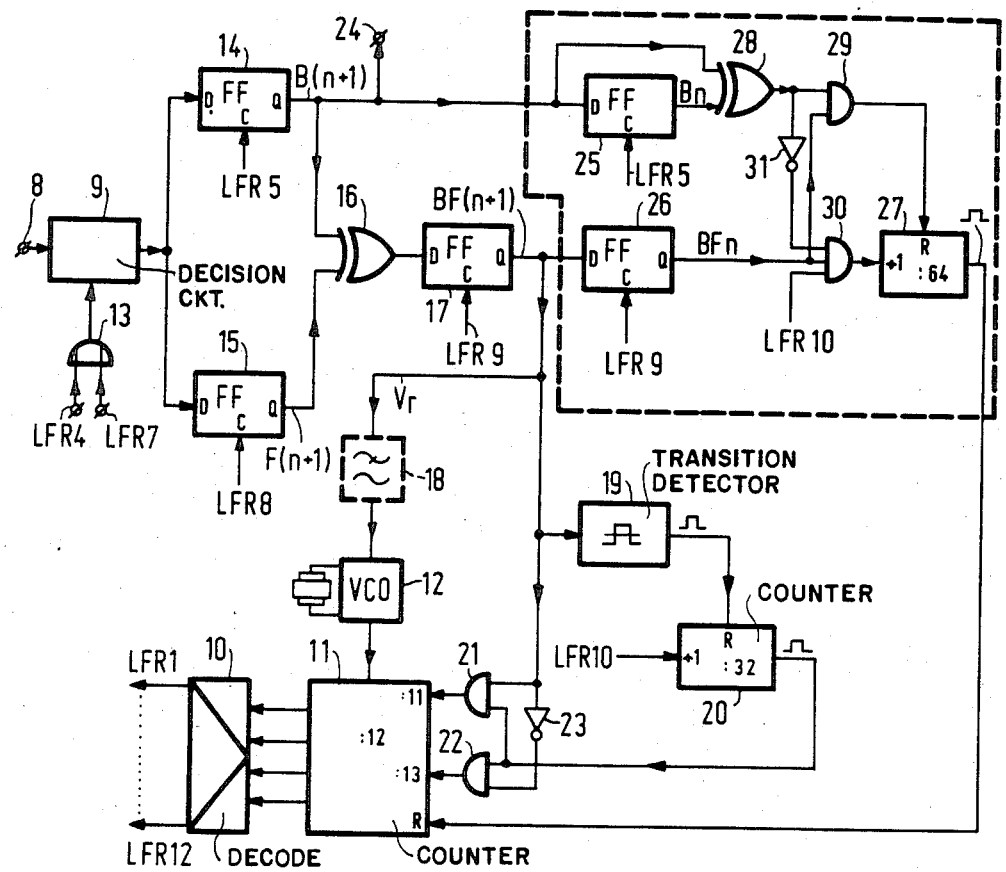

In FIG. 4, the received filtered biphase-encoded signal is applied to an input 8, which corresponds to input 4 of FIG. 2, and is applied from there to a decision circuit 9.

Figure 3:
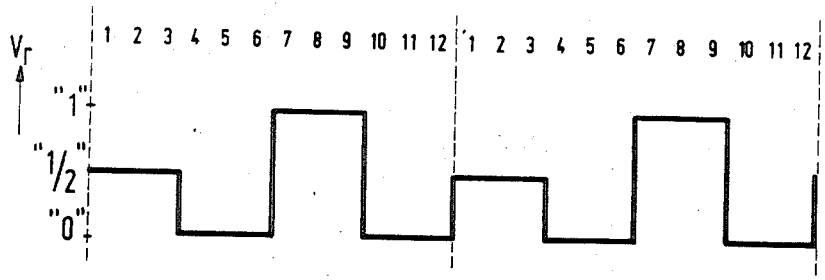

A decoding circuit 10, which is connected to a programmable counter 11 driven by a voltage-controlled oscillator (VCO) 12, produces in each symbol interval twelve mutually phase-shifted clock signals LFR1 ... LFR12, each related to a subinterval having the same number (FIG. 3).

The clock signals LF4 and LFR7 which determine the respective sampling instants tB and tF are applied to the decision circuit 9 via an OR-gate 13. The output of the decision circuit is connected to two flip-flops 14 and 15 which are driven at their clock inputs by clock signals LFR5 and LFR8, respectively, in response to which the respective signals $B(n+1)$ and $F(n+1)$ appear at their oututs, $n+1$ indicating the number of the present symbol interval and n denoting the number of the previous symbol interval.

The signals B and F are combined in a modulo-2 adder (EXCLUSIVE-OR gate) 16 and the result is applied to a flip-flop 17, which is driven by the clock signal LFR9. The output signal $BF(n+1)$ of flip-flop 17 is applied to VCO12, optionally after filtering if a low-pass filter 18 is provided. A transition detector 19 connected to the output of flip-flop 17 produces a pulse at each transition in the signal $BF(n+1)$ and causes therewith the reset of a 32-counter 20, which is driven by the clock signal LFR10. When thus the signal $BF(n+1)$ does not change during at least 32 symbol-intervals, then counter 20 produces an output pulse and thus causes a drive signal for two gates 21 and 22, which are also driven by the signal $BF(n+1)$ and the inverted version $\overline{BF(n+1)}$ thereof (inverter 23), respectively.

When the signal $BF(n+1)$ has a high level (is "1"), then the cycle of the programmable counter 11, which cycle normally comprises 12 clock pulses of the oscillator 12, is reduced once-only to 11 clock pulses: when the signal $BF(n+1)$ has a low level, then the cycle is lengthened once-only to 13 clock pulses. The result is a small shift of the phase of the clock signals at the outputs of the decoding circuit 10 such that sampling instant tF shifts towards the near-by low level to high level transition to be expected in the signal $BF(n+1)$.

The last-mentioned transition is either the transition between the subintervals 6 and 7 (FIG. 2), the "desired transition", or the transition between the subintervals 12 and 1, the "unwanted transition". In the case in which the sampling instant tF is stabilized at the transition 6-7, the decoded data appear at an output 24, i.e. the output of flip-flop 14, which corresponds to output 5 of FIG. 2.

In order to prevent or cancel synchornization of tF at the unwanted transition 12-1, a number of additional system parts has been provided, which together may be referred to as the false synchronization detector. It comprises inter alia two flip-flops 25 and 26 and a 64-counter 27.

The operation of the false-synchronization detector is based on the recognition that in the cases in which $Fn \neq Bn$, which is the case around the transitions 6-7 and 12-1, it always hold for the latter case that $Bn = B(n+1)$, independent of the data and that in the first case $Bn+1$, for random data, is on an average equally often equal to Bn as inequal to Bn.

The signal $B(n+1)$ is applied to a modulo-2 adder (EXCLUSIVE OR gate) 28 and to the flip-flop 25, which is driven by the clock signal LFR5. Prior to the occurrence of the clock signal, the signal Bn is stored in this flip-flop and this signal is added modulo-2 to the signal $B(N+1)$ in gate 28. The result is that the output signal of gate 28 is a "1" when $B(n+1) \neq Bn$ and a "0" when $B(n+1) = Bn$.

the signal $BF(n+1)$ is applied to flip-flop 26, which is driven by the clock signal LFR9. Prior to the occurrence of this clock signal, the signal Bn is stored in this flip-flop. The output signal of flip-flop 26 is applied to two AND-gates 29 and 30, to which also the output signal of gate 28 and the inverted version thereof (inverter 31) are respectively applied. Gate 30 is also driven by the clock signal LFR10.

The output of gate 30 is connected to the counting input of counter 27 and the output of gate 29 is connected to the reset input of counter 27. The result then is that at an instant determined by the clock signal LFR10 the content of counter 27 is incremented by one when $B(n+1) = Bn$. If in contrast therewith $B(n+1) \neq Bn$, then counter 27 is reset to its initial position by the output signal of gate 29. When the content of counter 27 has been incremented by one 64 times running without having received a resetting pulse, then counter 27 applies a resetting pulse to the programmable divider 11. This resetting pulse causes the most significant bit (MSB) of the content of counter 11 to be inverted, in response to which a shift is produced in the phase of the clock signals at the outputs of decoder 10, the shift having a duration of approximately half a period. This results in the sampling instant tF shifting from the region of the transition 12-1 to the region of the transition 6-7. Thereafer the sampling instant tF is stabilized at the last transition by the signal $BF(n+1)$ at the output of flip-flop 17, in the manner described in the foregoing.

What is claimed is:

1. Apparatus for generating clock signals from a received biphase modulated signal having a plurality of consecutive symbol intervals and a first or a second polarity, comprising
    a controllable clock signal source;
    means for sampling the polarity of said received signal at a first and second instant within at least one of said symbol intervals, said first and second instant being separated by less than half of said one symbol interval, and generating a first and second polarity signal respectively corresponding thereto;
    comparing means connected to said polarity sampling means for comparing said first and second polarity signals with each other and generating a first control signal or a second control signal corresponding, respectively, to absence or presence of equality therebetween, whereby only one active transition per symbol interval is detected; and
    means for applying said first or second control signal to said controllable clock signal source for readjusting the frequency and phase thereof, said controllable clock signal source generating said clock signals.

2. Apparatus as set forth in claim 1, wherein said sampling means samples in response to timing signals applied thereto;
    wherein said controllable clock signal source furnishes said timing signals;

further comprising means for applying said timing signals generated by said controllable clock signal source to said sampling means.

3. Apparatus as set forth in claim 2, wherein said first and second sampling instants are spaced from each other by approximately one-third to approximately one-fourth of said symbol interval.

4. Apparatus as set forth in claim 1, wherein said second instant follows said first instant by a predetermined time interval; and
wherein said comparing means comprises means for adding said first polarity signal modulo-2 to said second polarity signal.

5. The apparatus of of claim 1 wherein said controllable clock signal source is a voltage-controlled oscillator.

6. Apparatus for generating clock signals from a received biphase modulated signal having a plurality of consecutive symbol intervals and a first or a second polarity, comprising
a controllable clock signal source;
means for sampling the polarity of said received signal at only a first and second instant within at least one of said symbol intervals, said first and second instant being separated by less than half of said one symbol interval, and generating a first and second polarity signal respectively corresponding thereto;
comparing means connected to said polarity sampling means for comparing said first and second polarity signals with each other and generating a first control signal or a second control signal corresponding, respectively, to absence or presence of equality therebetween; and
means for applying said first or second control signal to said controllable clock signal source for readjusting the frequency and phase thereof, said controllable clock signal source generating said clock signals.

7. Apparatus for generating clock signals from a received biphase modulated signal having a plurality of consecutive symbol intervals and a first and a second polarity, said received signal having an active transition between the first and second polarities with said active transition representing a symbol, comprising:
(a) a controllable clock signal source;
(b) means for sampling the polarity of said received signal at a first and second instant within at least one of said symbol intervals, said first and second instant being separated by less than half of said one symbol interval, said second instant being timed to approximate the active transition of the received signal, said means for sampling generating a first and second polarity signal respectively indicating the polarity of said received signal at said first and second instant, said polarity sampling means also generating a polarity signal corresponding to said first polarity signal in the consecutive symbol interval subsequent to the one symbol interval;
(c) first comparing means connected to said polarity sampling means for comparing said first and second polarity signals with each other and generating a first control signal or a second control signal corresponding, respectively, to absence or presence of equality therebetween, whereby only one active transition per symbol interval is detected;
(d) means for applying said first or second control signal to said controllable clock signal source for readjusting the frequency and phase thereof, said controllable clock signal source generating said clock signals; and
(e) second means for comparing said first and corresponding polarity signals and generating a synchronization signal when said corresponding polarity signal has a predetermined relationship to said first polarity signal.

8. The apparatus of claim 7 wherein said second comparing means generates said synchronization signal when said corresponding polarity signal has said predetermined relationship to said first polarity signal continuously over said plurality of consecutive symbol intervals.

9. Apparatus as set forth in claim 7, wherein said synchronization signal is a false synchronization signal and said predetermined relationship is equality.

10. Apparatus for generating clock signals, from a received biphase modulated signal having a plurality of consecutive symbol intervals, each symbol interval having a first and second polarity, comprising:
(a) a controllable clock signal source producing timing intervals;
(b) means for dividing the timing intervals from the controllable clock signal source into a plurality of subintervals;
(c) means for sampling said polarity of said received signal at only a first and second subinterval produced by said dividing means, said first and second subinterval being within one of said symbol intervals and being separated by less than half of said one symbol interval;
(d) means for generating a first polarity signal at said first subinterval;
(e) means for generating a second polarity signal at said second subinterval;
(f) means for first comparing said first polarity signal with said second polarity signal and having an output at which a first control signal and a second control signal corresponding respectively to absence or presence of equality between said first and second polarity signals is provided, whereby only one active transition per symbol interval is detected;
(g) means for coupling said output of said first comparing means to said controllable clock signal source, whereby a phase-locked loop is formed;
(h) means for detecting a transition in the output of said first comparing means;
(i) first means for counting a number of consecutive ones of said consecutive symbol intervals in which no transition is detected by said transition detecting means;
(j) means for adding a subinterval to the output of said controllable clock signal source when said first counting means reaches a first maximum number of symbol intervals without a transition and when said first comparing means generates a first one of said first and second control signals;
(k) means for substracting a subinterval from the output of said controllable clock signal source when said comparing means generates the second one of said first and second control signals and when said first counting means reaches said first maximum number.

11. The apparatus of claim 10 wherein said coupling means comprises a lowpass filter.

12. The apparatus of claim 10 wherein each symbol interval has an active transition between the first and second polarities, said active transition representing a symbol and wherein said second subinterval is timed to approximate the active transition of the receive signal, the apparatus comprising:
- (l) first means for storing a first first polarity signal generated within said one symbol interval;
- (m) second means for comparing said first first polarity signal with a second first polarity signal generated within a symbol interval subsequent to said one symbol interval;
- (n) second means for storing the output of said first means for comparing;
- (o) means for second counting a number of ones of said symbol intervals for which the contents of said first storing means is said first control signal and said output of said second comparing means indicates that said first first polarity signal and said second first polarity signal are equal, said second counting means being reset to zero when said first storing means contains said first polarity signal and said output of said second comparing means indicates that said first first polarity signal and said second first polarity signal are not equal;
- (p) means for altering the phase of said timing intervals of said controllable clock signal source by approximately half of a period when said second counting means reaches a second maximum number.

* * * * *